United States Patent [19]

Sartorio et al.

[11] Patent Number: 5,397,159
[45] Date of Patent: Mar. 14, 1995

[54] TRANSMISSION COUPLING FOR A MANIPULATOR HEAD

[75] Inventors: Franco Sartorio; Bruno Ballesio; Stefano Vergano, all of Turin, Italy

[73] Assignee: Amada Company, Limited, Japan

[21] Appl. No.: 87,377

[22] Filed: Jul. 8, 1993

Related U.S. Application Data

[62] Division of Ser. No. 743,300, Aug. 14, 1991, Pat. No. 5,328,222.

[30] Foreign Application Priority Data

Dec. 19, 1989 [IT] Italy ................... 68128/89
Dec. 19, 1989 [IT] Italy ................... 68129/89

[51] Int. Cl.⁶ .......................... B25J 15/00
[52] U.S. Cl. .................. 294/86.4; 294/902; 294/64.1; 901/45
[58] Field of Search ........... 294/2, 86.4, 86.41, 294/64.1, 902; 901/30, 31, 39, 40, 45

[56] References Cited

U.S. PATENT DOCUMENTS

| | | | |
|---|---|---|---|
| 4,179,783 | 12/1979 | Inoyama et al. | 901/45 X |
| 4,661,037 | 4/1987 | Sugino et al. | |
| 4,717,003 | 1/1988 | McCormick et al. | 294/86.4 X |
| 4,801,240 | 1/1989 | Hautau et al. | 901/45 X |
| 4,863,206 | 9/1989 | Kaufmann | 294/86.4 |
| 5,176,022 | 1/1993 | Sartorio . | |

FOREIGN PATENT DOCUMENTS

| | | |
|---|---|---|
| 0030328 | 6/1981 | European Pat. Off. . |
| 0036912 | 10/1981 | European Pat. Off. . |
| 0115602 | 8/1984 | European Pat. Off. . |
| 2213212 | 7/1974 | France . |
| 2445199 | 7/1980 | France . |
| 2506195 | 11/1982 | France . |
| 8001547 | 8/1980 | WIPO . |

Primary Examiner—Dean J. Kramer
Attorney, Agent, or Firm—Wigman, Cohen, Leitner & Myers

[57] ABSTRACT

A transmission coupling for manipulator head includes a support body (50) connected to the manipulator head (4), an intermediate transmission member (76) slidable on the support body (50) along a first line (C), and an attachment member (28) slidable on the intermediate member (76) along a second line (B) perpendicular to the first line. The attachment member can pivot relative to the support body (50) about at least two mutually-perpendicular axes substantially parallel to the plane defined by the first and second lines. The present invention also relates to a rapid attachment device for an interchangeable tool for a manipulator head (104) including a base body (106) connected to the manipulator head and a generating device for providing a force for retaining the tool (102). The base body and the tool have respective cooperating abutment surfaces which are kept in contact as a result of the force exerted by the generating device and are adapted to establish the position of the tool relative to the head along a first line of constraint. Constraining members (118, 120) are provided for constraining the two degrees of freedom of the tool in a plane substantially perpendicular to the first line of constraint.

17 Claims, 5 Drawing Sheets

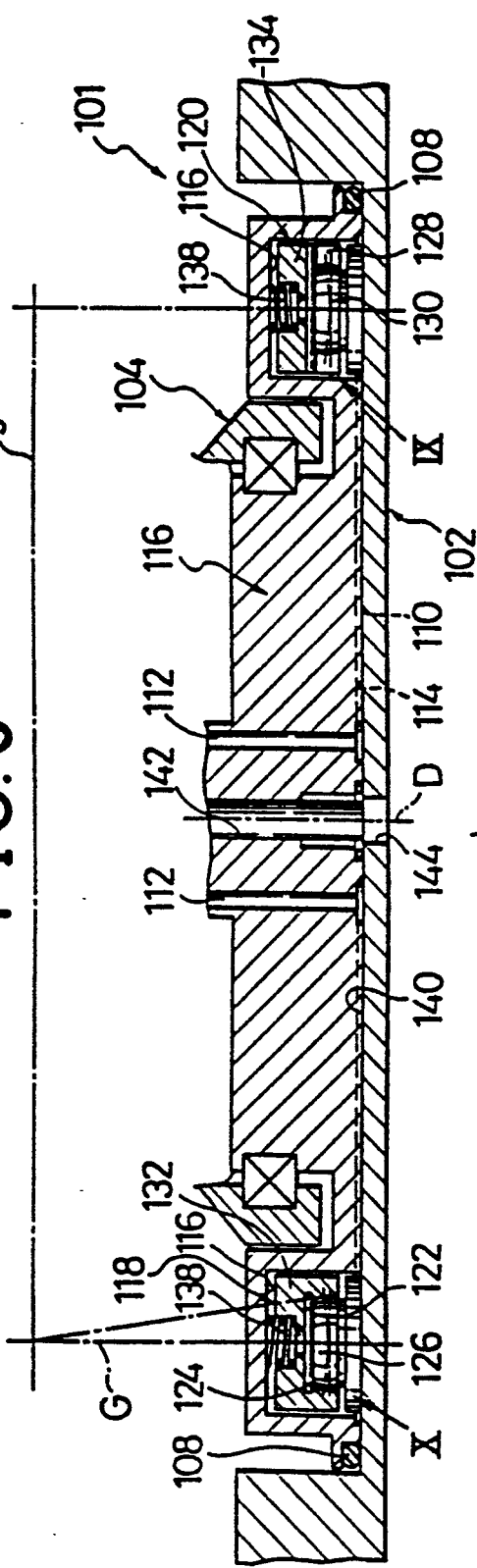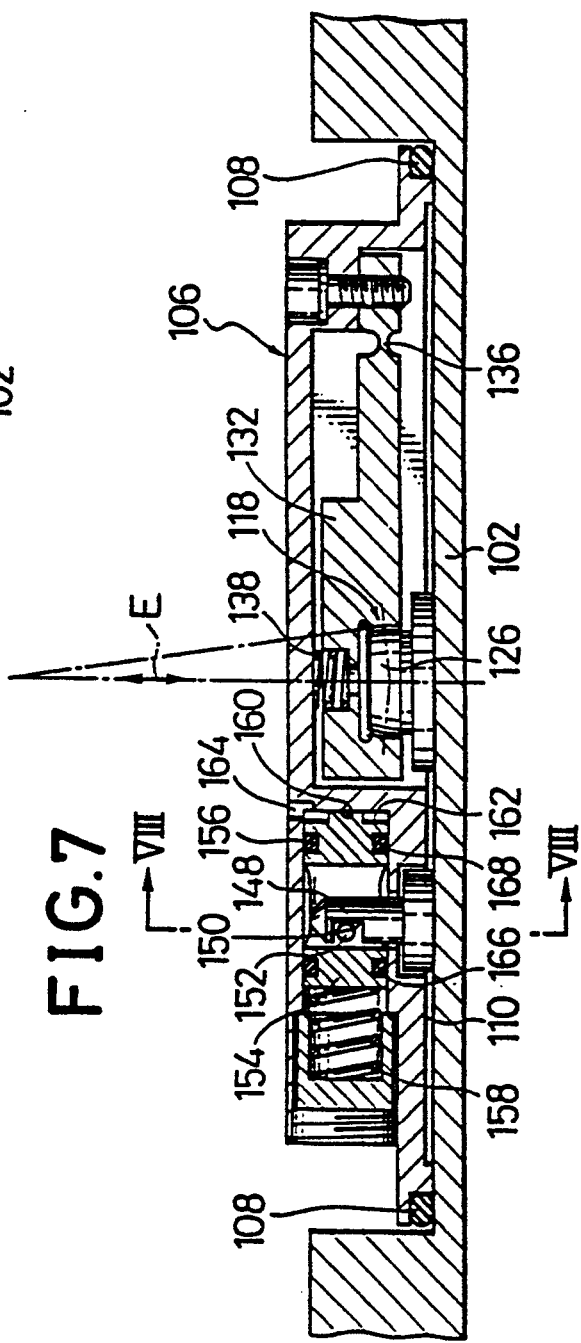

TRANSMISSION COUPLING FOR A MANIPULATOR HEAD

This is a divisional of application Ser. No. 07/743,300, filed on Aug. 4, 1991, now U.S. Pat. No. 5,328,222.

BACKGROUND OF THE INVENTION

The present invention relates to improvements of a manipulator head.

The present invention has been developed with particular regard to a manipulator device for pieces of sheet metal of the type forming the subject of the following applications, all of which are based on Italian Patent Application Nos. 67703-A/89 and 67704-A/89 both filed on Aug. 16, 1989.

Japanese Patent Application No. 2-216462
U.S. patent application Ser. No. 07/567,727, now U.S. Pat. No. 5,176,022.
U.K. Patent application No. 9017741.1
German Patent Application No. P4025988.9
French Patent Application No. 9010392
Korean Patent Application No. 90-12769
Swedish Patent Application No. 9002675-8
Chinese Patent Application No. 79108086
Swiss Patent Application No. 2656/90
Austrian Patent Application No. A 1698/90

FIGS. 1 and 2 schematically show a part of these applications. In FIGS. 1 and 2, two motor-driven manipulator heads indicated 2 and 4 are provided with respective attachment members 6, 8 rotatable on the heads 2, 4 about respective axes A, A'. In FIG. 1, respective gripping tools 10, 12 are fixed to the attachment members 6, 8 for gripping a metal sheet 1. In a different configuration of use, the attachment members 6, 8 are connected to operating equipment 16.

As a result of working tolerances, the axes of rotation A, A' of the heads 2, 4 may not be exactly coincident. In FIGS. 1 and 2, the error in the alignment of the axes has been exaggerated in order to facilitate understanding of the problem. Observation of FIGS. 1 and 2 makes it clear that the error in alignment of the axes A, A' causes considerable problems in the taking up of the sheet 1 or the equipment 16. This error causes further problems when the two attachment members are to contribute equally to the transmission of driving torque to the equipment 16.

Obviously, the problem of the relative errors in the geometry of the manipulator heads also exists in the more general case of a manipulator device having a single head to which any operating tool is connected.

The present invention further relates to an attachment device of the type comprising a base body connected to a manipulator head and having associated means for generating a force for retaining the tool, in which the body and the tool have constraining means for establishing the exact position of the tool relative to the head. The constraining means include a pair of co-operating abutment surfaces on the body and on the tool which are kept in contact as a result of the force exerted by the generating means and are adapted to establish the position of the tool relative to the head along a first line of constraint.

The above-mentioned applications describe a device for gripping metal sheet in which the interchangeable tool is constituted by a plate for picking up metal sheets and having a seat in which a base body carried by the head of a manipulator device is inserted. The force which retains the plate is generated by permanent magnets carried by the base body. The position of the plate relative to the body is defined by the contact between the walls of the cavity of the plate and corresponding walls of the body. The working tolerances of the contact surfaces of the body and the plate must be particularly close so that the plate is connected to the head without any play. The close tolerances between the contact surfaces, however, mean that the plate must be located in an extremely precisely defined position and the movement of the manipulator head towards the plate must also be extremely precise in order for the plate to be engaged without sticking or interference.

SUMMARY OF THE INVENTION

The first object of the present invention is to provide a transmission coupling for a manipulator head which compensates for the effects of any relative errors in the geometry in the manipulator head, According to the present invention, this object is achieved by the provision of a transmission coupling for a manipulator head, comprising: a support body connected to the manipulator head; an intermediate transmission member slidable on the support body along a first line; an attachment member slidable on the intermediate member along a second line perpendicular to the first line, and pivotable relative to the support body about at least two mutually-perpendicular axes substantially parallel to the plane defined by the first and second lines; and resilient means for keeping the attachment member in a predetermined position relative to the support body in the absence of external forces acting on the attachment member.

As will all become clear from the detailed description which follows, the transmission coupling according to the present invention reproduces the kinematic arrangement of an Oldham coupling and allows the attachment member to be positioned eccentrically relative to the support body. Moreover, the attachment member can compensate for any errors in parallelism of its axis since it is inclined to the support body.

The second object of the present invention is to provide an attachment device of the type defined above, which provides a connection without play and which enables the tool to be engaged and released even when there are errors in its positioning or errors in the movement of the manipulator head towards it, without giving rise to interference or sticking.

According to the present invention, this object is achieved by the provision of an attachment device of the type specified above, comprising: constraining means for establishing the exact position of the tool relative to the manipulator head, said constraining means also include first and second constraining members, each of which includes a seat for engagement by a positioning element, the constraining members defining respectively a turning pair and a sliding pair for constraining the two degrees of freedom of the tool in a plane substantially perpendicular to the first line of constraint.

Further characteristics and advantages of the present invention will become clear from the detailed description which follows with reference to the appended drawings, provided by way of non-limiting example.

BRIEF DESCRIPTION OF THE DRAWINGS

FIGS. 6 and 7 are sections taken on the lines VI—VI and VII—VII of FIG. 5;

DETAILED DESCRIPTION OF THE PREFERRED EMBODIMENTS

Figure 1:
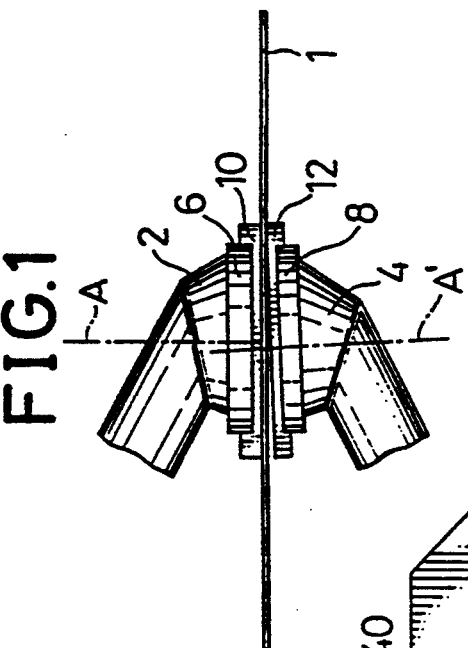
FIGS. 1 and 2, already described above, are schematic views of two motor-driven manipulator heads in different configurations of use.
Figure 2:
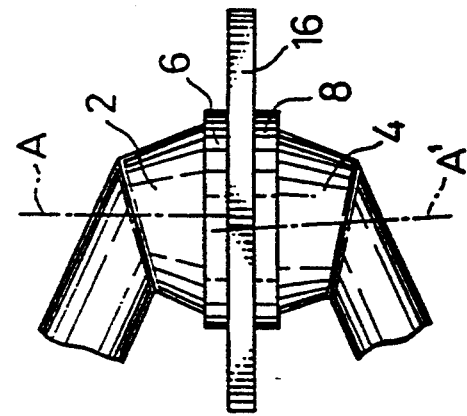
Figure 3:
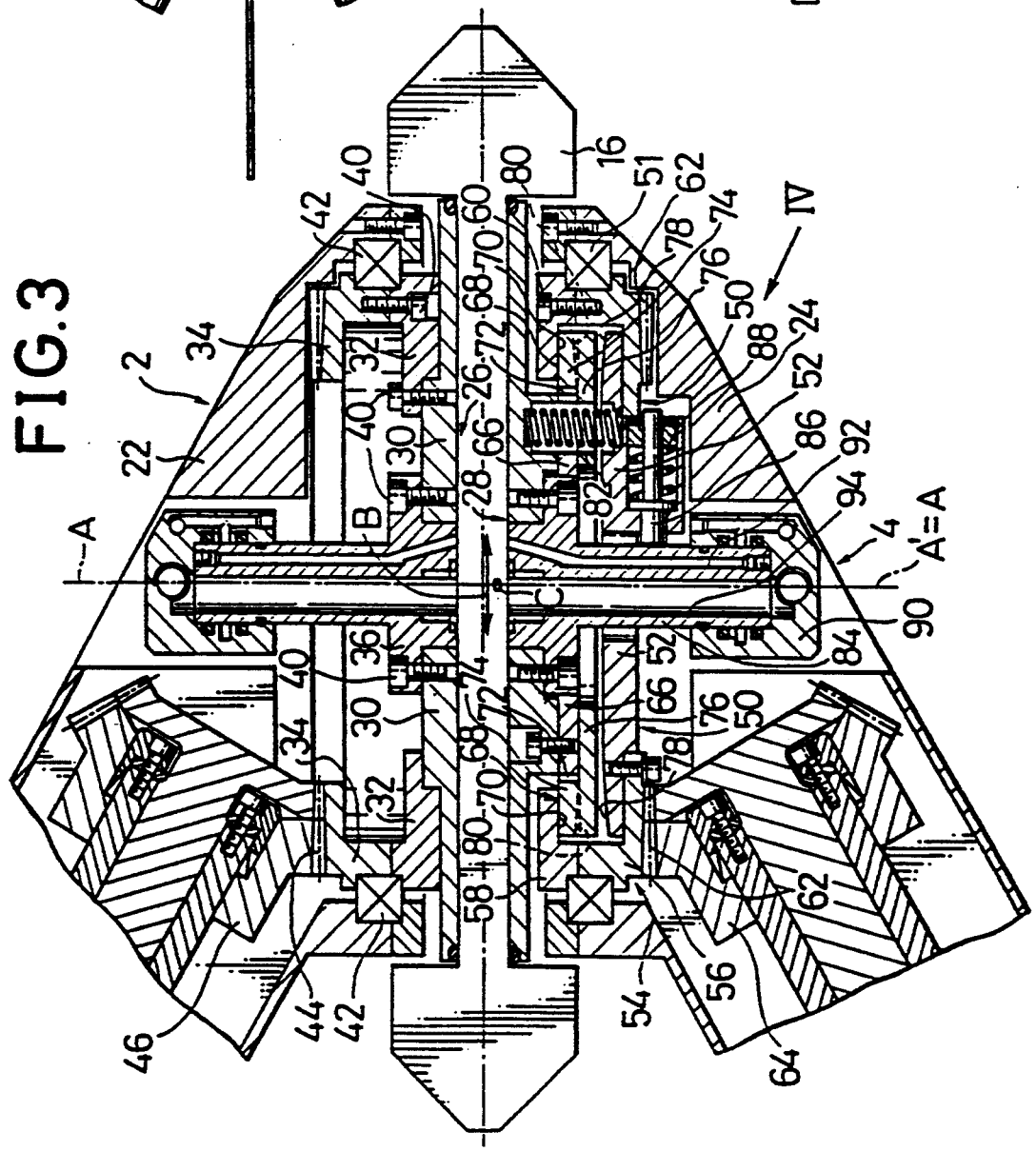
FIG. 3 is a cross-section of two manipulator heads, one of which includes a transmission coupling according to the present invention.

With reference to FIG. 3, first and second motor-driven manipulator heads are indicated 2 and 4. The heads 2, 4 are carried by respective motor-driven arms which can move the heads 2, 4 in unison or independently of each other along three mutually-perpendicular lines.

In the configuration illustrated in FIG. 3, the manipulator heads 2, 4 hold operating equipment 16, shown schematically in the drawings. The manipulator heads 2, 4 have respective base structures 22, 24 which carry respective attachment members 26, 28. The members 26, 28 have attachment devices (not illustrated) which fix the equipment 16 to each of the attachment members 26, 28. An attachment device will be described in detail later.

The attachment member 26 of the first manipulator head 2 is constituted by four pieces, indicated 30, 32, 34 and 36, fixed together by screws 40 so as to form a single rigid member which is supported by the structure 22 so as to be rotatable about an axis A by means of a rolling bearing 42. The piece 34 of the attachment member 26 has a bevel gear 44 which is meshed with a motor-driven bevel pinion 46. In the case of the first manipulator head 2, the attachment member 26 is supported rigidly, that is, the orientation of its axis of rotation A is fixed.

In the case of the second manipulator head 4, however, the attachment member 28 is carried by the structure 24 with the interposition of a transmission coupling according to the present invention, and this means that the axis of rotation A' of the attachment member 28 is coincident with the axis of rotation A of the member 26 even in the presence of errors resulting from working tolerances and the like.

The transmission coupling includes a support body 50 mounted on the structure 24 for rotation about the axis A' by means of a rolling bearing 51. The support body 50 is constituted by a base element 52 to which a channel-sectioned ring 54 is fixed. The ring 54 in turn is constituted by two elements 56, 58 fixed together by screws 60. The element 56 of the ring 54 has a set of teeth 62 which mesh with a motor-driven pinion 64.

The attachment member 28 of the second manipulator head 4 is fixed to a disc 55 one surface 68 of which faces an abutment surface 70 of the element 58 which forms part of the support body 50. A pair of guide grooves 72 are formed in the disc 66 and are engaged by respective projections 74 of an intermediate transmission member 76.

Figure 4:
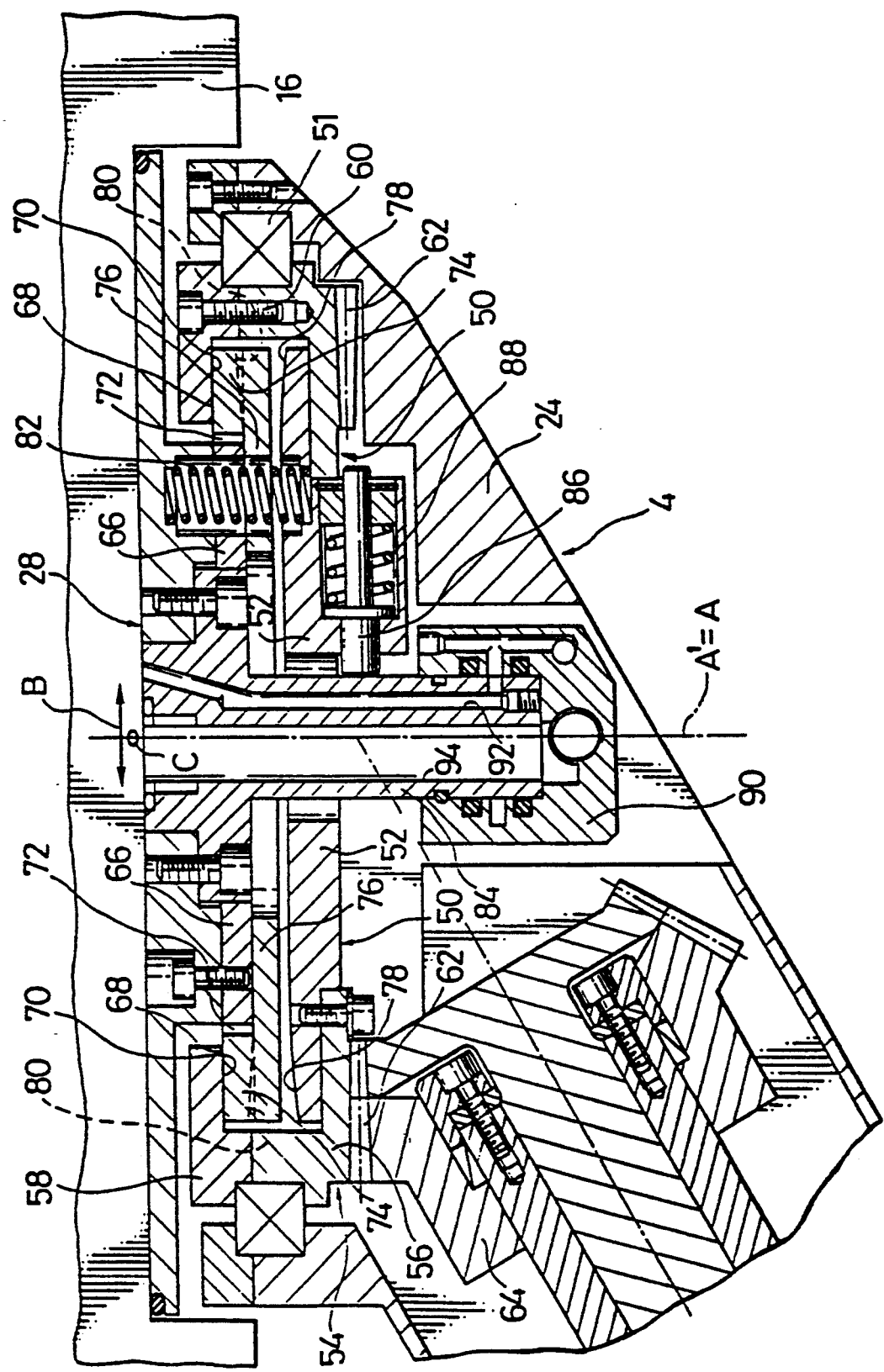
FIG. 4 is a section of the part indicated by the arrow IV of FIG. 3, on an enlarged scale.

The transmission member 76 is also provided with the second pair of projections (not visible in the drawings) which lie in a plane perpendicular to the plane of representation of FIGS. 3 and 4 and engage respective guide grooves (also not visible in the drawings) formed in the base member 52 of the support body 50.

From a kinematic point of view, the attachment member 28, the intermediate member 76 and the support body 50 constitute an Oldham joint which enables drive to be transmitted between eccentric axes. The attachment member 28 is slidable relative to the intermediate member 76 along the line indicated by the double arrow B. The attachment member 28 is guided by the projections 74 in the grooves 72 along the arrow B. The intermediate member 76 is in turn slidable relative to the support body 50 along a line C perpendicular to the plane of representation of FIGS. 3 and 4. In this case, the intermediate transmission member 76 is guided by the projections in the guide grooves (not shown) mentioned above along line C.

The base member 52 of the support body 50 has a marginal zone 78 with a spherical profile on its surface facing the intermediate transmission member 76. In the same manner, the disc 66 of the attachment member 28 has a spherically-profiled marginal zone 80 on its surface facing the intermediate member 76. By virtue of the spherical portions 78 and 80, the attachment member 28 is free to pivot about any axis in a plane perpendicular to the axis of rotation A when it is acted upon by an external eccentric force.

A plurality of helical springs 82 (only one of which is visible in FIG. 3) is interposed between the attachment member 28 and the support body 50 and urges the surface 68 of the disc 66 into contact with the abutment surface 70 of the support body 50.

The attachment member 28 includes an element having a cylindrical portion 84 which extends parallel to the axis A'. Three thrust members 86 (only one of which is visible in FIG. 3) which are angularly spaced by 120° act on the lateral surface of the cylindrical portion 84. The members 86 are carried by the support body 50 and are pressed radially towards the cylindrical portion 84 by respective helical springs 88.

The springs 88 bias the attachment member 28 constantly into alignment with the axis of rotation A of the support body 50 and, together with the springs 82, ensure that, as long as the attachment member 28 is not subjected to external forces, it remains in a predetermined position relative to the support body 50 and hence with respect to the manipulator head 4.

The cylindrical portion 84 of the attachment member 28 extends through apertures formed in the intermediate member 76 and in the support body 50 and its free end is connected to a fixed manifold 90. Ducts 92, 94 are formed in the cylindrical portion 84 and are connected through the manifold 90 to a vacuum source and to a pressurized-fluid source, respectively. The pressurized-fluid flow is directed to ducts, not illustrated, in the operating equipment 16 while the vacuum in the duct 92 ensures that the equipment 16 is fixed to the attachment member 28.

A further embodiment of the invention is illustrated in FIGS. 5–10. With reference to the drawings, a device for the rapid attachment of an interchangeable tool 102 to a motor-driven manipulator head, indicated 104 and shown schematically in FIG. 6, is indicated 101.

In the embodiment shown in the drawings, the tool 102 is constituted by a plate for picking up a metal sheet and its operation is described in detail in the above-mentioned application. The motor-driven head 104 forms a part of a manipulator, not shown, which may be of the type described and illustrated in the above application.

A base body 106 is connected to the end of the head 104 and is rotatable relative to the head 104 about an axis D. As can be seen in FIGS. 6 and 7, the body 106 carries a seal 108 which extends right around the perimeter of the body 106 and encloses an airtight chamber 110. The chamber 110 communicates with a pair of ducts 112 which pass through the body 106 (FIGS. 5 and 6) and are connected to a vacuum source (not shown). Ribs 114 (shown in broken outline in FIG. 5) are formed on the surface of the body 106 facing the chamber 110 and define a flat abutment surface perpendicular to the axis D. A pair of recessed seats 116 are formed in the body 106 and first and second constraining members, indicated 118 and 120 respectively, are situated therein.

The first constraining member 118 is constituted by a seat 122 with a conical surface portion 124 in which an engagement element 126 carried by the tool 102 is inserted. In the embodiment shown in the drawings, the engagement element 126 is constituted by a pin with a spherical surface portion. The second constraining member 120 is also constituted by a seat 128 engaged by a pin 130 identical to the pin 126. In this case, the seat 128 is constituted by two flat surfaces 131 which converge in a V-shaped arrangement and between which the head of the pin 130 is engaged (see FIG. 9 in particular). The walls 131 constituting the seat 128 converge towards an axis, indicated J in FIG. 6, which is parallel to the abutment surface defined by the ribs 114 and intersects the axis G of the seat 122 of the first constraining member 118.

Figure 5:
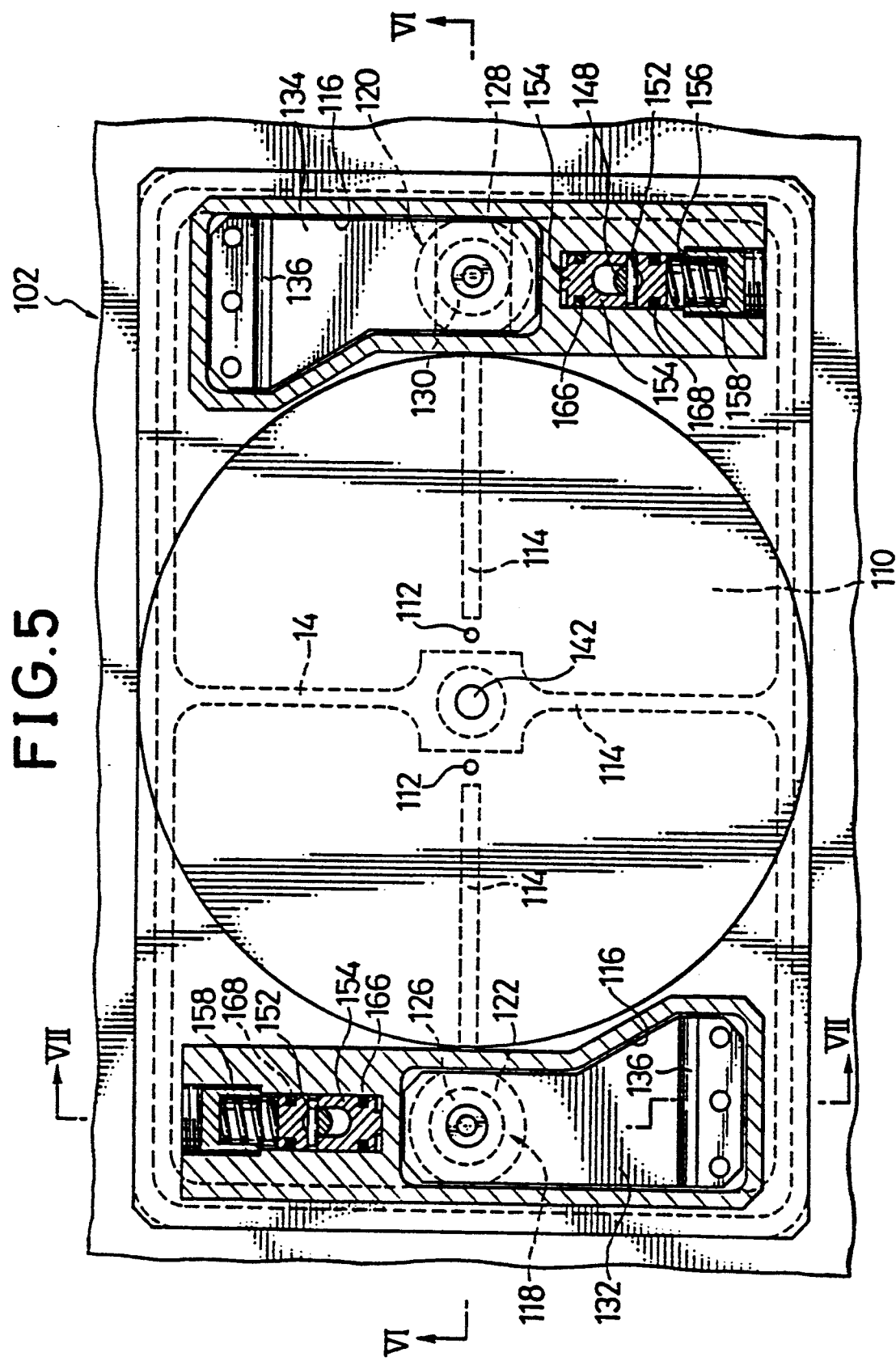
FIG. 5 is a partially-sectioned plan view of an attachment device according to the present invention.

The seats 122, 128 of the constraining members 118, 120 are formed in respective oscillating supports 132, 134 fixed to the base body 106. As can be seen in FIGS. 5 and 7, each support 132, 134 has a portion 136 of reduced thickness which can be deformed resiliently to enable the support to perform small oscillations in the directions indicated by the double arrow E in FIG. 7. Since the oscillations are of small amplitude, the movements of the support 132, 134 in the directions of the arrow E will be substantially rectilinear. A helical spring 138 is interposed between the support 132 and the body 106 and opposes the displacement of the support 32.

The tool 102 has a flat abutment surface 140 which is urged against the abutment surface constituted by the ribs 114 by the vacuum created in the chamber 110 of the body as a result of the activation of the vacuum source. The abutment between the surface 140 of the tool 102 and the ribs 114 of the body 106 defines the position of the tool along a first direction of constraint perpendicular to the plane of the surfaces 114, 140 and coincident with the axis D. The resilient yielding of the supports 132, 134 of the constraint members 118, 120 ensures isostatic constraint along the axis D. The ribs 114 prevent the tool 102 from deforming under the action of the retaining force generated by the vacuum in the chamber 110.

Figure 10:
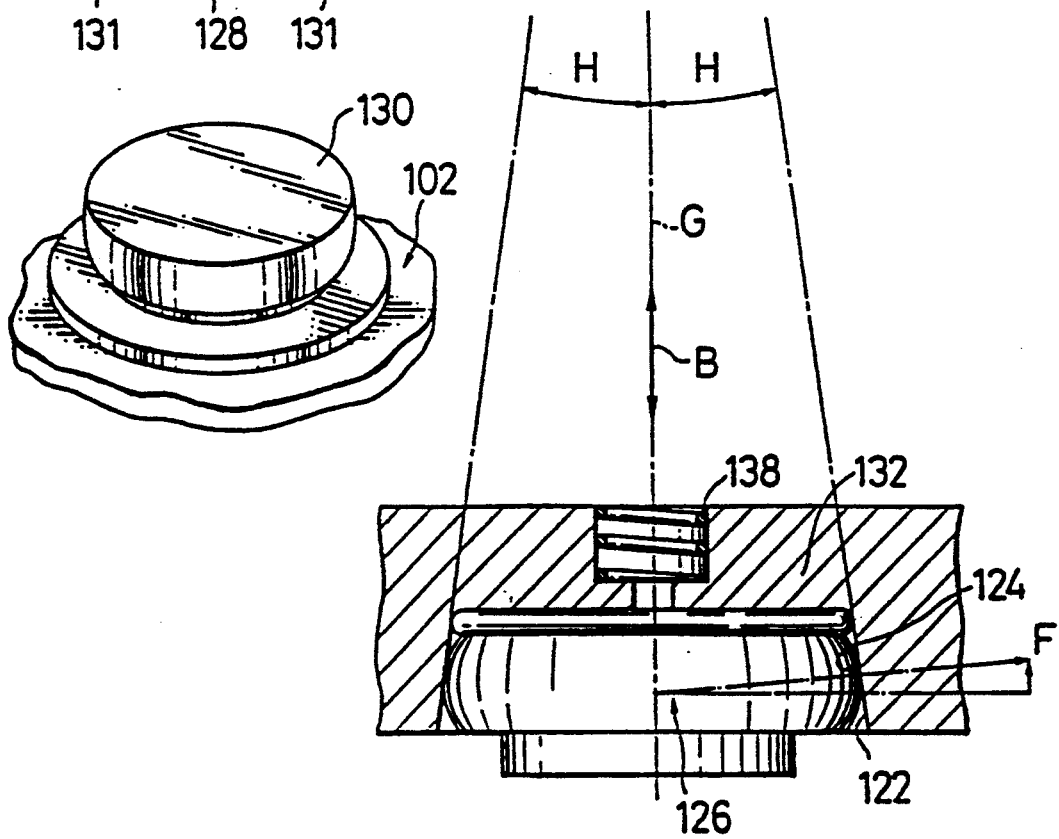
FIG. 10 is a view of the part indicated by the arrow X in FIG. 6, on an enlarged scale.

As can be seen in FIG. 10, the half-angle H of opening of the conical seat 122 of the first constraining member 118 is very small, substantially equal to the angle of friction between the materials (typically steel) constituting the pin 126 and the seat 122. The angle between the plane of symmetry of the seat 128 of the second constraining member 120 and each of the walls 131 is also substantially equal to the angle of friction between the materials constituting the pin 130 and the seat 128.

The forces exchanged between the pins 126, 130 and the respective seats 122, 128 are directed perpendicular to the surfaces of the seats and thus have a very small component in the direction E (see FIG. 10). Each spring 138 has to balance a weak force and is therefore dimensioned so as not to be very stiff.

The reaction force of the springs 138 which opposes the force retaining the tool 102 will therefore be negligible compared with the retaining force.

The first constraining member 118 constitutes a turning pair, whilst the second constraining member 120 constitutes a sliding pair. The two members 118, 120 constrain the two degrees of freedom of the tool 102 in the plane perpendicular to the first line of constraint D and enable the tool 102 to be positioned precisely and without play relative to the base body 106. The constraint of the tool 102 in the plane perpendicular to the line D by the members 118, 120 is also an isostatic constraint and therefore defines the position of the tool 102 univocally in that plane.

The body 106 has a further duct 142 which communicates with a hole 144 in the tool 102 and enables a chamber (not shown) of the attachment 102 to be connected to a vacuum source. Alternatively, pressurised fluid can be sent to the tool 102 through the duct 142.

Figure 8:
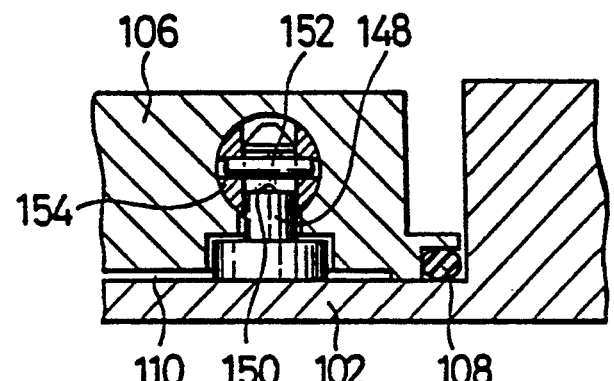
FIG. 8 is a section taken on the line VIII—VIII of FIG. 7.
Figure 9:
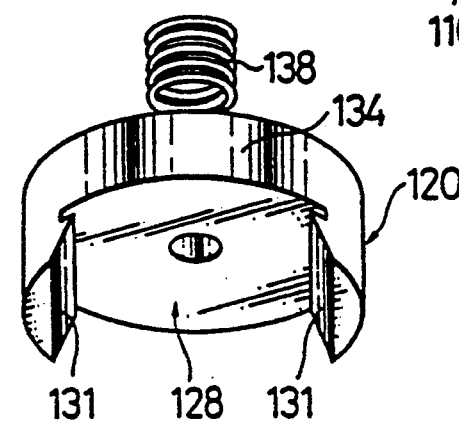
FIG. 9 is an exploded perspective view of the part indicated by the arrow IX in FIG. 6.

The attachment device 101 is also provided with safety means which prevent the tool 102 from being detached from the body 106 if there is an accidental loss of the vacuum which generates the force for retaining the tool 102. As can be seen in FIGS. 5, 7 and 8, the safety means comprise a pair of pins 148 carried by the tool 102, each of which has a recess 150 which engages a stop 152 carried by a piston 154 mounted for sliding in a hole 156 in the body 106. A helical spring 158 acts on one end of the piston 154 and tends to keep the piston 154 in a configuration corresponding to the engagement of the stop 152 with the pin 148. A shoulder 160 is formed on the opposite end of the piston 154 and, together with the end wall of the hole 156, defines a chamber 162 which communicates with a duct 164 (FIG. 7) connected to a pressurised-fluid source (not shown). The piston 154 carries a pair of sealing rings 166, 168 which, as well as sealing the chamber 162, contribute to the solation of the chamber 110 which would otherwise be in communication with the external atmosphere through the clearance between the pin 148 and its seat in the body 106.

In order to release the tool 102, the source which creates the vacuum in the chamber 110 is switched off and pressurized fluid is simultaneously sent into the chamber 162 through the ducts 164.

The tool 102 is engaged by placing the body 106 against the tool 102 and switching on the vacuum source. The shape of the constraining members 118 and 120 means that the tool 102 is engaged correctly even when there are slight errors in the positioning of the tool 102 relative to the head 104 or errors in the movement of the head 104 towards the tool 102.

Naturally, the principle of the invention remaining the same, the forms of embodiment and details of construction may be varied widely with respect to those described and illustrated, without thereby departing from the scope of the present invention.

What is claimed is:

1. A rapid attachment device for an interchangeable tool for a manipulator head, comprising:
   a base body connected to the manipulator head;
   means for generating a force for retaining the tool;
   constraining means for establishing the exact position of the tool relative to the manipulator head, said constraining means including a pair of cooperating abutment surfaces on the base body and on the tool which are kept in contact as a result of the force exerted by the generating means and are adapted to establish the position of the tool relative to the head along a first line of constraint;
   the constraining means including first and second constraining members, each of which includes a seat for engagement by a positioning element, the constraining members for constraining the two degrees of freedom of the tool in a plane substantially perpendicular to the first line of constraint, said positioning element of the first constraining member being a pin having a spherical surface portion, and the respective seat having a conical surface.

2. A device according to claim 1, wherein half the angle of opening of the conical surface is substantially equal to the angle of friction between the materials constituting the pin and the seat.

3. A device according to claim 1, wherein the pins are carried by the tool and the respective seats are carried by the base body.

4. A device according to claim 3, wherein the seats are carried by respective oscillating supports fixed to the base body and having resiliently yielding portions.

5. A device according to claim 4, wherein the resiliently yielding portions are interposed between each of the oscillating supports and the base body and tend to oppose the displacement of the support.

6. A device according to claim 1, wherein the seats of the constraining members can yield resiliently in a direction substantially parallel to the first line of constraint.

7. A device according to claim 6, wherein the seats are carried by respective oscillating supports fixed to the base body and having resiliently yielding portions.

8. A rapid attachment device for an interchangeable tool for a manipulator head, comprising:
   a base body connected to the manipulator head;
   means for generating a force for retaining the tool, said generating means comprising an airtight chamber defined between the base body and the tool, and a vacuum source connected thereto;
   constraining means for establishing the exact position of the tool relative to the manipulator head, said constraining means including a pair of cooperating abutment surfaces on the base body and on the tool which are kept in contact as a result of the force exerted by the generating means and are adapted to establish the position of the tool relative to the head along a first line of constraint;
   the constraining means including first and second constraining members, each of which includes a seat for engagement by a positioning element, the constraining members defining respectively a turning pair and a sliding pair for constraining the two degrees of freedom of the tool in a plane substantially perpendicular to the first line of constraint.

9. A rapid attachment device for an interchangeable tool for a manipulator head, comprising:
   a base body connected to the manipulator head;
   means for generating a force for retaining the tool;
   constraining means for establishing the exact position of the tool relative to the manipulator head, said constraining means including a pair of cooperating abutment surfaces on the base body and on the tool which are kept in contact as a result of the force exerted by the generating means and are adapted to establish the position of the tool relative to the head along a first line of constraint;
   the constraining means including first and second constraining members, each of which includes a seat for engagement by a positioning element, the constraining members defining respectively a turning pair and a sliding pair for constraining the two degrees of freedom of the tool in a plane substantially perpendicular to the first line of constraint; and mechanical safety means for preventing the detachment of the tool from the base body in the event of the operational failure of the means for generating the tool-retaining force.

10. A device according to claim 9, wherein the safety means include a pin carried by the tool and having a recess which cooperates with a stop carried by a piston mounted for sliding relative to the base body.

11. A device according to claim 10, wherein resilient means are associated with the piston and tend to keep it in a position corresponding to the engagement of the stop with the pin.

12. A device according to claim 11, wherein the piston communicates with a chamber carried by a pressurized-fluid source which can be activated selectively to cause the piston to slide towards a position in which it is disengaged from the pin.

13. A rapid attachment device for an interchangeable tool for a manipulator head, comprising:
   a base body connected to the manipulator head;
   means for generating a force for retaining the tool;
   constraining means for establishing the exact position of the tool relative to the manipulator head, said constraining means including a pair of cooperating abutment surfaces on the base body and on the tool which are kept in contact as a result of the force exerted by the generating means and are adapted to establish the position of the tool relative to the head along a first line of constraint;
   the constraining means including first and second constraining members, each of which includes a seat for engagement by a positioning element, the constraining members for constraining the two degrees of freedom of the tool in a plane substantially perpendicular to the first line of constraint, said positioning element of the second constraining member being a pin with a spherical surface portion, and the respective seat being in the form of a groove formed by two converging flat walls.

14. A device according to claim 13, wherein the walls constituting the seat converge towards an axis parallel to the abutment surface and intersecting the axis of the seat of the first constraining member.

15. A device according to claim 13, wherein the angle between each of the flat walls and the plane of symmetry of the seat of the second constraining member is substantially equal to the angle of friction between the materials constituting the pin and the seat.

16. A device according to claim 13, wherein the pins are carried by the tool and the respective seats are carried by the base body.

17. A device according to claim 13, wherein the seats are carried by respective oscillating supports fixed to the base body and having resiliently yielding portions.

* * * * *